United States Patent
Klein et al.

(10) Patent No.: US 12,072,746 B2
(45) Date of Patent: Aug. 27, 2024

(54) INPUT CURRENT LIMITING FOR REDUNDANT POWER SUPPLY LOSS ON MODULAR PLATFORMS

(71) Applicant: Dell Products L.P., Round Rock, TX (US)

(72) Inventors: Craig A. Klein, Elgin, TX (US); Geoff A. Dillon, Pflugerville, TX (US); Alexander J. Hoganson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 17/851,334

(22) Filed: Jun. 28, 2022

(65) Prior Publication Data

US 2023/0418349 A1 Dec. 28, 2023

(51) Int. Cl.
  *G06F 1/26* (2006.01)
  *G06F 1/28* (2006.01)
  *G06F 1/30* (2006.01)
  *G06F 11/20* (2006.01)

(52) U.S. Cl.
  CPC .............. *G06F 1/263* (2013.01); *G06F 1/28* (2013.01); *G06F 1/30* (2013.01); *G06F 11/2015* (2013.01)

(58) Field of Classification Search
  CPC ... G06F 1/263; G06F 1/28; G06F 1/30; G06F 11/2015
  See application file for complete search history.

(56) References Cited

U.S. PATENT DOCUMENTS

| | | | |
|---|---|---|---|
| 7,590,873 B2 | 9/2009 | Takahashi et al. | |
| 7,761,718 B2 | 7/2010 | Yasuo et al. | |
| 10,916,326 B1* | 2/2021 | Holmberg, Jr. | G06F 11/073 |
| 2004/0179334 A1* | 9/2004 | Kinnard | G06F 1/263 361/709 |
| 2010/0011229 A1* | 1/2010 | Davis | G11B 19/20 713/300 |
| 2022/0317752 A1* | 10/2022 | Hartwell | G06F 1/263 |

* cited by examiner

*Primary Examiner* — Glenn A. Auve
(74) *Attorney, Agent, or Firm* — Larson Newman, LLP (57) ABSTRACT

An information handling system includes first and second power supplies, a chassis BMC, and a sled. The power supplies each assert a power good indication when the power supply is providing power on a power rail. The chassis BMC receives the power good indications and asserts a loss of redundancy indication when one of the power good indications is deasserted. The sled includes a sled BMC and a host processing system. The sled receives the loss of redundancy indication and in response, asserts a processor over temperature indication to the host processing system. When both power good indications are asserted, the chassis BMC directs the sled BMC to operate the host processing system in accordance with a normal operation sled current limit. When one of the power good indications is deasserted, the chassis BMC directs the sled BMC to operate the host processing system in accordance with a reduced power operation sled current limit. The reduced power operation sled current limit is a lower limit than the normal operation sled current limit.

20 Claims, 4 Drawing Sheets

INPUT CURRENT LIMITING FOR REDUNDANT POWER SUPPLY LOSS ON MODULAR PLATFORMS

FIELD OF THE DISCLOSURE

This disclosure generally relates to information handling systems, and more particularly relates to providing input current limiting for redundant power supply loss on modular platforms.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include first and second power supplies, a chassis BMC, and a sled. The power supplies may each assert a power good indication when the power supply is providing power on a power rail. The chassis BMC may receive the power good indications and assert a loss of redundancy indication when one of the power good indications is deasserted. The sled may include a sled BMC and a host processing system. The sled may receive the loss of redundancy indication and in response, assert a processor over temperature indication to the host processing system. When both power good indications are asserted, the chassis BMC may direct the sled BMC to operate the host processing system in accordance with a normal operation sled current limit. When one of the power good indications is deasserted, the chassis BMC may direct the sled BMC to operate the host processing system in accordance with a reduced power operation sled current limit. The reduced power operation sled current limit may be a lower limit than the normal operation sled current limit.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
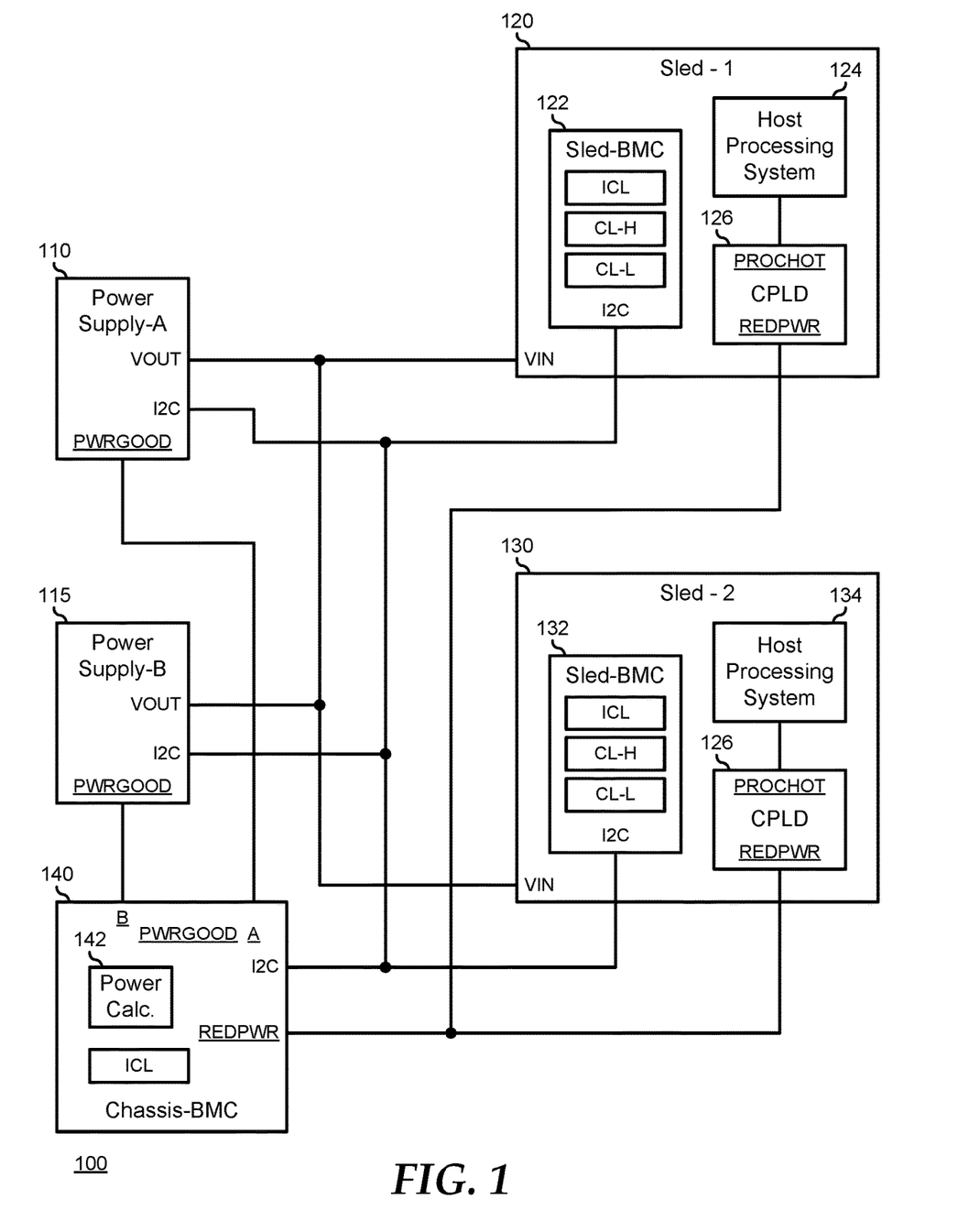
FIG. 1 is a block diagram of an information handling system according to an embodiment of the current disclosure.

FIG. 1 illustrates a information handling system 100 including redundant power supplies 110 and 115, processing sleds 120 and 130, and a chassis Baseboard Management Controller (BMC) 140. Information handling system 100 represents a modular system, such as a sled-based system, a blade system, or another system that includes a chassis that provides a common set of resources, such as redundant power supplies 110 and 115, storage capacity, system cooling, input/output infrastructure, and the like. The common resources are all provided to enable various processing functions as provided by sleds 120 and 130. As such, sled 120 includes a sled BMC 122, a host processing system 124, and a Complex Programmable Logic Device (CPLD) 125. Here, the processing functions of sled 120 are provided by host processing system 124 which may include one or more processor, attached memory devices, storage media, and other hardware elements. Host processing system 124 will be understood to instantiate a Basic Input/Output System (BIOS)/Universal Extensible Firmware Interface (UEFI) to launch and run an operating system (OS) upon which the various processes, applications, programs, and the like are run. Similarly, sled 130 includes a sled BMC 132, a host processing system 134, and a CPLD 135. Further, the processing functions of sled 130 are provided by host processing system 134, similar to host processing system 124.

Power supplies 110 and 115 each include one or more voltage outputs (VOUT) that are ganged together to provide a particular voltage rail to voltage inputs (VIN) of sleds 120 and 130. Power supplies 110 and 115 further include output signals that indicate that the output power on the respective voltage output (VOUT) is valid and that the respective power supply is in good operating condition (PWRGOOD). The output signals (PWRGOOD) are provided to chassis BMC 140, as described further below.

Power supplies 110 and 115, sled BMCs 122 and 132, and chassis BMC 140 each include an Inter-Integrated Circuit (I2C) interface that are all coupled together on a common I2C bus. The coupling of all of the I2C interfaces together on the common I2C bus is illustrative of a particular topology, and other topologies may be utilized, as needed or desired. For example one or more of the I2C interfaces may be accessed through an I2C multiplexor, or information handling system 100 may include two (2) or more I2C interfaces, as needed or desired. Further, other elements of information handling system 100 may include I2C interfaces, as needed or desired. It will be understood that the I2C interfaces and the associated I2C bus may be replaced by other communication interfaces, as needed or desired. For example, one or more of the elements of information handling system 100 may include Improved Inter-Integrated Circuit (I3C) interfaces and be coupled to an I3C bus, one or more elements may be coupled together by a Network Controller Sideband Interface (NC-SI), or another interface, as needed or desired.

Chassis BMC 140 includes an output signal (REDPWR) that indicates that information handling system 100 has lost redundancy of power supplies 110 and 115. For example, when one of power supplies 110 or 115 deasserts the PWRGOOD signal, chassis BMC 140 detects the loss of redundancy of the power supplies. In response, chassis BMC 140 operates to assert the REDPWR signal. The REDPWR signal is received by CPLDs 126 and 136. When CPLD 126 receives the REDPWR signal, the CPLD asserts a system power shedding signal (PROCHOT) to host processing system 124 and the host processing system operates to shed power within the elements of the host processing system. For example, host processing system 124 can reduce in input voltage to a processor of the host processing system, can reduce a clock frequency for the processor, can reduce other operating voltages or clock frequencies, can instruct the processor to shut down internal processing functions, and the like, in order to rapidly reduce the power demand of sled 120.

Similarly, when CPLD 136 receives the REDPWR signal, the CPLD asserts a PROCHOT signal to host processing system 134 and the host processing system operates to shed power within the elements of the host processing system, similarly to the shedding of power by the processor of host processing system 124, as described above. As illustrated, sleds 120 and 130 include respective CPLDs 126 and 136. However other types of logic devices may be utilized as needed or desired. For example, a CPLD may be replaced by a Field Programmable Gate Array (FPGA) device, another type of logic device, a discrete logic circuit, or another type of device or circuit, as needed or desired.

The mechanisms described above related to the assertion and deassertion of the PWRGOOD signals, the REDPWR signal, and the PROCHOT signals are provided in order for information handling system 100 to rapidly respond to changing situations in the provision of power to the information handling system. However, the original intent of the PROCHOT signal was to prevent damage to the elements of a host processing system, and particularly to a processor of the host processing system in the case of an over-temperature situation in the processor or other elements of the host processing system. Because of that, the power shedding performed in response to the PROCHOT signal is extreme, and is not typically conducive to prolonged operation because of the extreme loss of performance by the information handling system. On the other hand, conditions that precipitate the loss of redundancy may include the failure of one of power supplies 110 and 115.

In a typical application of a modular system similar to information handling system 100 each of power supplies 110 and 115 are supplied with a line voltage from one or more power distribution units (PDUs) (not illustrated), and each PDU will be coupled to a different phase of a multi-phase power grid, or to different circuit breakers on the power grid. As such, additional conditions that precipitate the loss of redundance may further include the loss of an input power phase or the switching off of a breaker associated with the particular one of power supplies 110 and 115 that deasserted the PWRGOOD signal. In either case, the loss of redundancy among power supplies 110 and 115 may not necessitate the extreme response embodied by the PROCHOT mechanism, That is, the information handling system may be capable of providing a diminished performance level that is nevertheless greater than the performance level provided by the PROCHOT mechanism in response to the loss of redundancy, but use of only the PROCHOT mechanism limits any potential up side in performance.

Information handling system 100 operates to limit the performance of the overall information handling system based upon a maximum Input Current Level (ICL). In particular, because information handling system 100 retains certain functions associated with legacy monolithic information handling systems, such as stand-alone servers, rack servers, workstations, and the like, the management applications associated with the information handling system typically operate within the context of a single BMC, rather than the multiple-BMC domain as illustrated. Sled BMCs 122 and 132 may be likened to a BMC of a monolithic information handling system, such as by monitoring, managing, and maintaining the functions and features of respective host processing systems 124 and 134, and respective sleds 120 and 130. For example, sled BMC 122 may provide an out-of-band mechanism to monitor the operation of sled 120, to manage the settings and functional options of the sled, including managing the power levels of the sled and workloads processed by host processing system 124, and maintain the operating state, including updating of device firmware of the sled. On the other hand, chassis BMC 140 provides similar functionality for the common functions provided by the chassis, including overall thermal management, power management between the overhead functions of the chassis and the sleds, outward communication with a management system of a datacenter that includes information handling system 100, and the like.

It has been understood by the inventors of the current disclosure that the legacy management suite typically ascribes the maintenance of the chassis ICL to one or more of sled BMCs 122 and 132. However, sleds 120 and 130, and particularly sled BMCs 122 and 132 do not have direct access to control the power distribution between the sleds based upon the received ICL, having only the REDPWR signal to indicate the loss of redundancy, and having no knowledge of the operating conditions of the other sleds in information handling system 100. On the other hand, chassis BMC may have knowledge of the overall power state of information handling system 100, but has limited ability to control the functioning of sleds 120 and 130 in response to loss of redundancy, beyond the assertion of the REDPWR signal.

Chassis BMC 140 includes a power calculation module 142 that operates to manage the power levels of information handling system 100, including the overhead elements, such as power supplies 110 and 115, system fans, I/O modules, and the like, and sleds 120 and 130. In particular, power calculator module 142 receives the ICL information from one or both of sled BMCs 122 and 132, and determines if there is any mismatch in the received ICL values. A system administrator may log on to one or both of sled BMCs 122 and 132 to program the respective ICLs. The system administrator may utilize knowledge of a data center, such as a total current available to multiple information handling systems, and the number of information handling systems, and provide the ICL to sled BMCs 122 and 132 based upon a calculation of an allowable maximum current level for each information handling system so as to not exceed the total current available.

It may be possible to inadvertently mis-program one or more ICL value in sled BMCs 122 and 132. As such, when power calculator module 142 receives the individual ICL values from sled BMCs 122 and 132, the power calculator module can identify mismatched ICL values. If a majority of the sleds of information handling system 100, including sleds 120 and 130 indicate a common ICL value, then chassis BMC 140 operates to reset any mismatched ICL values to the most common ICL value. On the other hand, if a majority of the sled ICL values to not agree, then chassis BMC 140 operates to provide an indication to a management system of the data center of the mismatched ICLs. Chassis BMC 140 can operate to halt the operations of sleds 120 and 130 until such time as new, matching ICL values are programmed into sled BMCs 122 and 132, as needed or desired.

Power calculator module 142 further operates to provide a sled current limit (CL-H) for normal operation, that is, when power supplies 110 and 115 are operating redundantly, for sleds 120 and 130. Here, power calculator module 142 may take the ICL value, subtract off a current value for the overhead functions of information handling system 100, then divide the remaining current value among the number of sleds in the information handling system. Thus the sled current limit may be provided as:

$$CL\text{-}H = (ICL - \text{Overhead})/N: \quad \text{Equation 1,}$$

where N is the number of sleds in information handling system 100. For example, chassis BMC 142 may determine that power supplies 110 and 115 are each capable of providing 20 amps, for a total redundant capacity of 40 amps, but that the ICL value for information handling system 100 is 30 amps. Further, chassis BMC 142 may determine that the overhead functions of information handling system 100 demand four (4) amps. Power calculator module 142 will determine that the redundant state sled current limit (CL-H) is equal to (30-4)/2=13 amps, and chassis BMC 140 operates to load the redundant state sled current limit (CL-H) to sled BMCs 122 and 132.

Sled BMCs 122 and 132 then manage the operations of respective sleds 120 and 130 in accordance with the received sled current limit (CL-H).

Power calculator module 142 further operates to provide a sled current limit (CL-L) for reduced power operation, that is when one of power supplies 110 and 115 has failed, for sleds 120 and 130. Power calculator module 142 may take the maximum current value of a single power supply, subtract off a current value for the overhead functions of information handling system 100, then divide the remaining current value among the number of sleds in the information handling system. Thus the sled current limit may be provided as:

$$CL\text{-}L = (PS_{Max} - \text{Overhead})/N: \quad \text{Equation 2,}$$

where $PS_{Max}$ is the maximum current value of a single power supply. Power calculator module 142 will determine that the reduced state sled current limit (CL-L) is equal to (20-4)/2=eight (8) amps, and chassis BMC 140 operates to load the redundant state sled current limit (CL-L) to sled BMCs 122 and 132. Sled BMCs 122 and 132 then manage the operations of respective sleds 120 and 130 in accordance with the received sled current limit (CL-L). Note that without a sled current limit (CL-L) for reduced power operation, sleds 120 and 130 may be expected to reduce their current consumption by half, to 6.5 amps, having lost one of two power supplies. Thus the implementation of the sled current limit (CL-L) for reduced power operation permits the sleds to operate at a higher current level, thereby optimizing performance in the reduced power operation mode.

In a particular embodiment, when power supplies 110 and 115 are operating redundantly, sled BMCs 122 and 132 manage respective sleds 120 and 130 in accordance with the normal operation sled current limit (CL-H). Then, when chassis BMC 140 receives an indication that one of power supplies 110 or 115 are faulty, for example by that power supply deasserting the PWRGOOD signal, the chassis BMC quickly asserts the REDPWR signal. In response, CPLDs 126 and 136 assert their respective PROCHOT signals, and respective host processing systems 124 and 134 respond by rapidly shedding their loads to a highly reduced power state.

Upon detecting the assertion of the REDPWR signal, sled BMCs 122 and 132 perform operations to begin to manage respective sleds 120 and 130 in accordance with the reduced power operation sled current limit (CL-L). When the change from redundant power operation to reduced power operation is completed, sled BMCs 122 and 132 direct respective CPLDs 126 and 136 to deassert their respective PROCHOT signals, and respective host processing systems 124 and 134 operate under the reduced power operation sled current limit (CL-L). Then, as such time as the redundant operation of power supplies 110 and 115 is restored, chassis BMC 140 deasserts the REDPWR signal and sled BMCs 122 and 132 detect the deassertion and perform operations to begin to manage respective sleds 120 and 130 in accordance with the normal operation sled current limit (CL-H), and operation of respective host processing systems 124 and 134 under the normal operation sled current limit (CL-H) is restored.

In a particular embodiment, when CPLDs 126 and 136 detect the assertion of the REDQWR signal from chassis BMC 140, the CPLDs provide an indication to their respective sled BMCs 122 and 132, and the sled BMCs take this indication as their direction to change the operating mode from the normal operation sled current limit (CL-H) to the reduced power operation sled current limit (CL-L). This indication can be to the exclusion of a direction from chassis BMC 140 via the I2C interface, or may be in addition to the direction from the chassis BMC via the I2C interface. While the operations and management of power levels in the current disclosure are provided in the context of electrical current limits, this is not necessarily so, and other measurements, such as Watts, may be utilized, as needed or desired.

Figure 2:
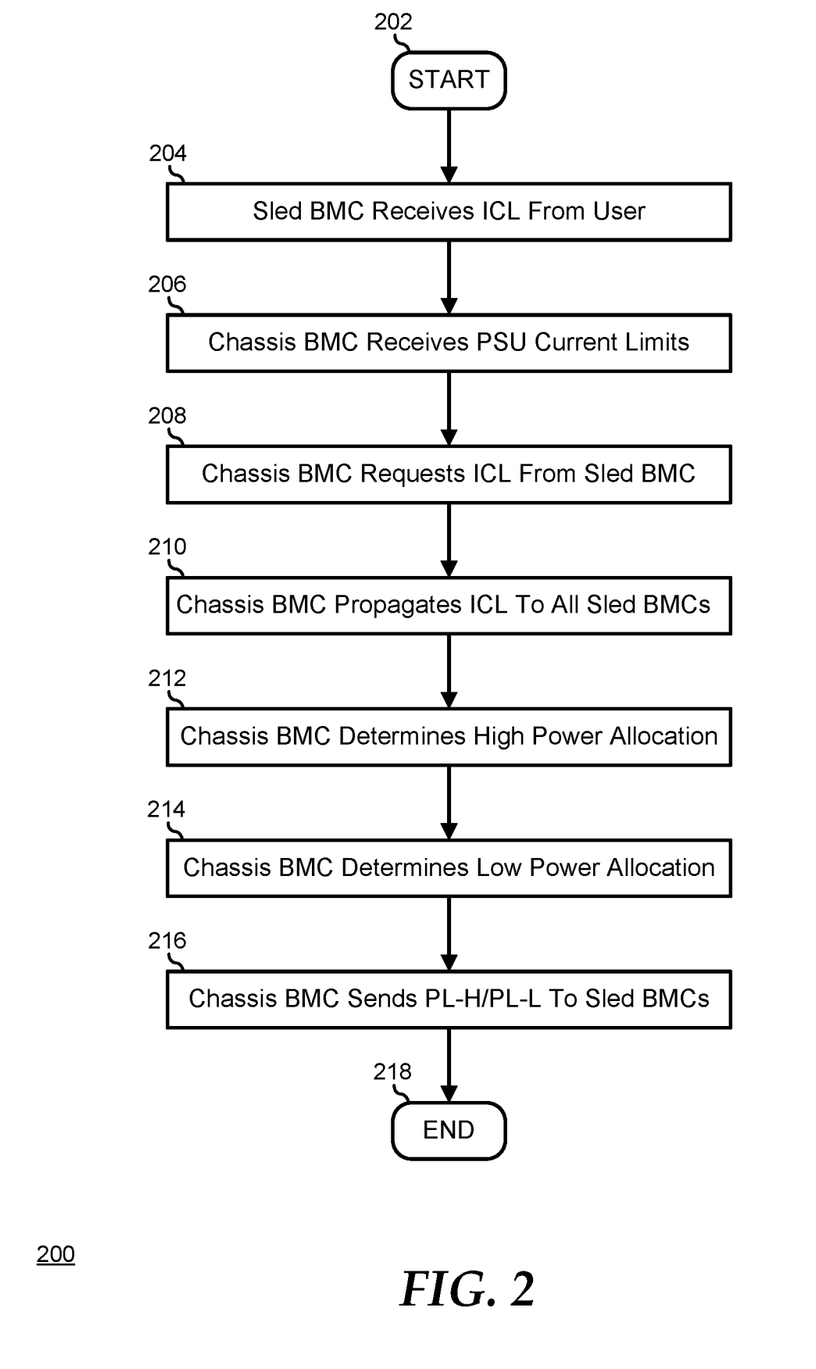
FIG. 2 is a flowchart illustrating a method for determining current limits in a modular information handling system according to an embodiment of the current disclosure.

FIG. 2 illustrates a method 200 for determining current limits in a modular information handling system, starting at block 202. A sled BMC of a modular information handling system receives an ICL value from a system administrator of a data center in block 204. A chassis BMC receives the maximum output current limits of redundant power supplies of the modular information handling system in block 206. The chassis BMC requests the ICL value from the sled BMC in block 208. The chassis BMC propagates the ICL value to the other sleds of the modular information handling system in block 210. The chassis BMC may determine whether or not there is any conflict in the ICL value among the sled BMCs, and can resolve any such conflicts. The chassis BMC determines a normal operation sled current limit (CL-H) in block 212, and a reduced power operation sled current limit (CL–L) in block 214. The chassis BMC sends the normal operation sled current limit (CL–H) and the reduced power operation sled current limit (CL–L) to the sled BMCs in block 216, and the method ends in block 218.

Figure 3:
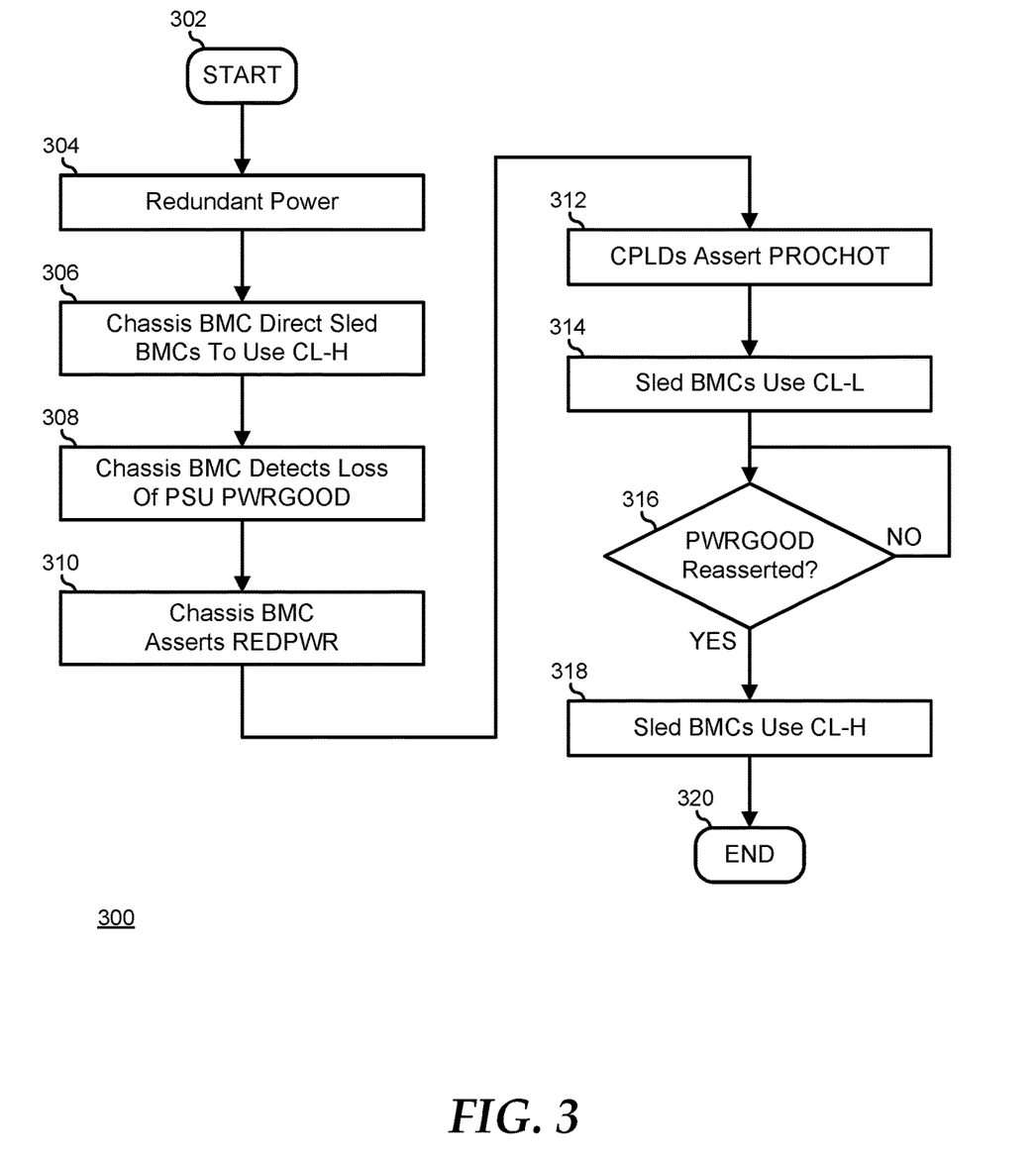
FIG. 3 is a flowchart illustrating a method for managing current limits in a modular information handling system according to an embodiment of the current disclosure.

FIG. 3 illustrates a method 300 for managing current limits in a modular information handling system, starting at block 302. A modular information handling system is set to operate with redundant power supplies in block 304. A chassis BMC of the modular information handling system directs the sleds of the modular information handling system to utilize the normal operation sled current limit (CL–H) in block 306. The chassis BMC detects the loss of a PWR-GOOD signal from one of the power supplies in block 308. In response, the chassis BMC asserts a REDPWR signal to the sleds, indicating that the modular information handling system is operating in a reduced power operation in block 310. The CPLDs respond to the assertion of the REDPWR signal by asserting the PROCHOT signal for their respective sleds in block 312, in response to which the respective host processing systems enter a highly reduced power state.

The sled BMCs change from the normal operation sled current limit (CL–H) to the reduced power operation sled current limit (CL–L) in block 314. A decision is made as to whether or not the chassis BMC detects the reassertion of the PWRGOOD signal from the particular power supply in decision block 316. If not, the "NO" branch of decision block 316 is taken and the method loops back to decision block 316 until the chassis BMC detects the reassertion of the PWRGOOD signal from the particular power supply. When the chassis BMC detects the reassertion of the PWR-GOOD signal from the particular power supply, the "YES" branch of decision block 316 is taken, the sled BMCs change from the reduced power operation sled current limit (CL–L) to the normal operation sled current limit (CL–H) in block 318, and the method ends in block 320.

Figure 4:
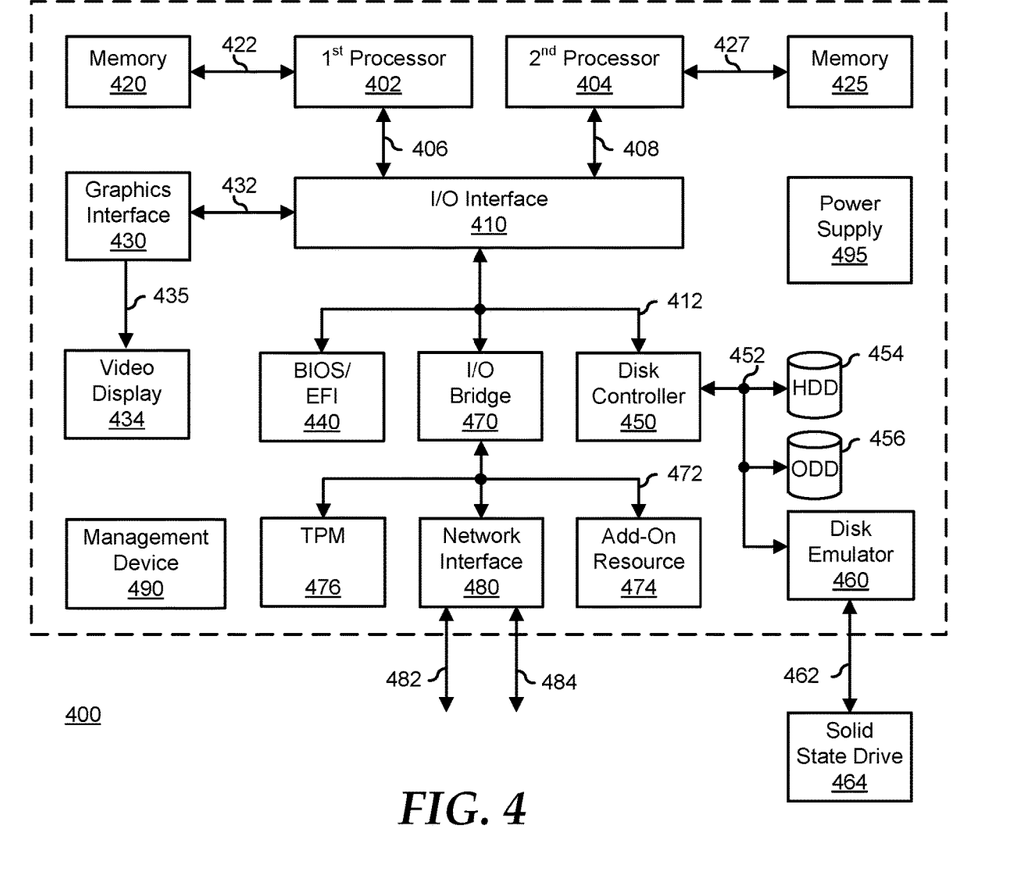
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware.

Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a first power supply unit configured to assert a first power good indication when the first power supply is providing power on a power rail of the information handling system;
a second power supply unit configured to assert a second power good indication when the second power supply is providing power on the power rail;
a chassis Baseboard Management Controller (BMC) configured to receive the first and second power good indications and to assert a loss of redundancy indication when one of the first and second power good indications is deasserted; and
a first sled including a first sled BMC and a first host processing system, the first sled configured to receive the loss of redundancy indication and to assert a first processor over temperature indication to the first host processing system in response to receiving the loss of redundancy indication;
wherein when both the first and second power good indications are asserted, the chassis BMC directs the first sled BMC to operate the first host processing system in accordance with a normal operation sled current limit; and
wherein when one of the first and second power good indications is deasserted, the chassis BMC directs the first sled BMC to operate the first host processing system in accordance with a reduced power operation sled current limit, the reduced power operation sled current limit being a lower limit than the normal operation sled current limit.

2. The information handling system of claim 1, wherein the first sled BMC is configured to receive a first input current limit (ICL).

3. The information handling system of claim 2, wherein the chassis BMC is further configured to receive the first ICL, and to calculate the normal operation sled current limit based upon the first ICL.

4. The information handling system of claim 3, wherein the normal operation sled current limit is determined as:
CL-H=(ICL1−Overhead)/N, where CL-H is the normal operation sled current limit, ICL1 is the first ICL, Overhead is an amount of current associated with an overhead operation of the information handling system, and N is a number of sleds in the information handling system.

5. The information handling system of claim 4, wherein the chassis BMC is further configured to receive a maximum output current for the first and second power supplies.

6. The information handling system of claim 5, wherein the reduced power operation sled current limit is determined as:
CL-L=(PSMax−Overhead)/N, where CL-L is the reduced power operation sled current limit and PSMax is the maximum output current.

7. The information handling system of claim 1, further comprising a second sled including a second sled BMC and a second host processing system, the second sled configured to receive the loss of redundancy indication and to assert a second processor over temperature indication to the second host processing system in response to receiving the loss of redundancy indication.

8. The information handling system of claim 7, wherein the chassis BMC is further configured to provide a first ICL to the second sled BMC.

9. The information handling system of claim 7, wherein the second sled BMC is configured to receive a second ICL.

10. The information handling system of claim 9, wherein the chassis BMC is further configured to determine that a first ICL associated with the first sled is different from the second ICL, to select the second ICL, and to provide the second ICL to the first sled BMC.

11. A method, comprising:
asserting, by a first power supply of an information handling system, a first power good indication when the first power supply is providing power on a power rail of the information handling system;
asserting, by a second power supply unit of the information handling system, a second power good indication when the second power supply is providing power on the power rail;
receiving, by a chassis Baseboard Management Controller (BMC) of the information handling system, the first and second power good indications;
asserting, by the chassis BMC, a loss of redundancy indication when one of the first and second power good indications is deasserted; and
receiving, by a first sled of the information handling system, the loss of redundancy indication;
asserting, by the first sled, a first processor over temperature indication to a first host processing system of the first sled in response to receiving the loss of redundancy indication;
determining, by the chassis BMC, that both the first and second power good indications are asserted;
directing, by the chassis BMC, a first sled BMC of the first sled to operate the first host processing system in accordance with a normal operation sled current limit when both the first and second power good indications are asserted;
determining, by the chassis BMC, that one of the first and second power good indications is deasserted; and
directing, by the chassis BMC, the first sled BMC to operate the first host processing system in accordance with a reduced power operation sled current limit when one of the first and second power good indications is deasserted, the reduced power operation sled current limit being a lower limit than the normal operation sled current limit.

12. The method of claim 11, further comprising receiving, by the first sled BMC, a first input current limit (ICL).

13. The method of claim 12, further comprising:
receiving, by the chassis BMC, the first ICL; and
calculating the normal operation sled current limit based upon the first ICL.

14. The method of claim 13, wherein the normal operation sled current limit is determined as:
CL-H=(ICL1−Overhead)/N, where CL-H is the normal operation sled current limit, ICL1 is the first ICL, Overhead is an amount of current associated with an overhead operation of the information handling system, and N is a number of sleds in the information handling system.

15. The method of claim 14, further comprising receiving, by the chassis BMC, a maximum output current for the first and second power supplies.

16. The method of claim 15, wherein the reduced power operation sled current limit is determined as:
CL-L=(PSMax−Overhead)/N, where CL-L is the reduced power operation sled current limit and PSMax is the maximum output current.

17. The method of claim 11, further comprising:
receiving, by a second sled of the information handling system, the loss of redundancy indication; and
asserting, by the second sled, a second processor over temperature indication to a second host processing system of the second sled in response to receiving the loss of redundancy indication.

18. The method of claim 17, further comprising providing, by the chassis BMC, a first ICL to the second sled BMC.

19. The method of claim 17, further comprising:
receiving, by a second sled BMC of the second sled, a second ICL;
determining, by the chassis BMC, that a first ICL associated with the first sled is different from the second ICL;
selecting the second ICL; and
providing the second ICL to the first sled BMC.

20. An information handling system, comprising:
a first power supply unit configured to assert a first power good indication when the first power supply is providing power on a power rail of the information handling system;
a second power supply unit configured to assert a second power good indication when the second power supply is providing power on the power rail;
a chassis Baseboard Management Controller (BMC) configured to receive the first and second power good indications and to assert a loss of redundancy indication when one of the first and second power good indications is deasserted; and a sled including a sled BMC, a host processing system, and a Complex Programmable Logic Device (CPLD), wherein the CPLD is configured to receive the loss of redundancy indication and to assert a first processor over temperature indication to the first host processing system in response to receiving the loss of redundancy indication;

wherein when both the first and second power good indications are asserted, the chassis BMC directs the sled BMC to operate the host processing system in accordance with a normal operation sled current limit, and when one of the first and second power good indications is deasserted, the chassis BMC directs the sled BMC to operate the host processing system in accordance with a reduced power operation sled current limit, the reduced power operation sled current limit being a lower limit than the normal operation sled current limit.

\* \* \* \* \*